(12) United States Patent
Chiesa et al.

(10) Patent No.: US 8,737,389 B2
(45) Date of Patent: May 27, 2014

(54) EGRESS CLOCK DOMAIN SYNCHRONIZATION TO MULTIPLE INGRESS CLOCKS

(75) Inventors: Luca Della Chiesa, Concorezzo (IT); Stefano Binetti, Monza (IT); Gilberto Loprieno, Milan (IT)

(73) Assignee: Cisco Technology, Inc., San Jose, CA (US)

(*) Notice: Subject to any disclaimer, the term of this patent is extended or adjusted under 35 U.S.C. 154(b) by 174 days.

(21) Appl. No.: 13/267,088

(22) Filed: Oct. 6, 2011

(65) Prior Publication Data

US 2013/0089170 A1 Apr. 11, 2013

(51) Int. Cl.
*H04L 12/66* (2006.01)

(52) U.S. Cl.
USPC .......................................... 370/354; 370/503

(58) Field of Classification Search
USPC .................. 370/350, 354, 466, 503, 508, 509
See application file for complete search history.

(56) References Cited

U.S. PATENT DOCUMENTS

| | | | |
|---|---|---|---|
| 6,657,970 B1* | 12/2003 | Buckingham et al. | 370/249 |
| 6,831,959 B1 | 12/2004 | Manchester | |
| 6,839,858 B1 | 1/2005 | James et al. | |
| 7,649,910 B1* | 1/2010 | Wechsler et al. | 370/503 |
| 7,724,751 B2* | 5/2010 | Uchimoto et al. | 370/395.6 |
| 7,725,038 B2 | 5/2010 | Somashekhar | |
| 7,773,606 B2* | 8/2010 | Dobjelevski et al. | 370/395.62 |
| 8,059,685 B2* | 11/2011 | Ghodrat et al. | 370/503 |
| 8,064,485 B1* | 11/2011 | Montini et al. | 370/503 |
| 8,094,683 B2* | 1/2012 | Shirasaki | 370/474 |
| 8,149,871 B2* | 4/2012 | Loprieno et al. | 370/466 |
| 8,270,428 B2* | 9/2012 | Qui et al. | 370/442 |
| 8,340,010 B2* | 12/2012 | Diab | 370/311 |
| 8,416,763 B1* | 4/2013 | Montini et al. | 370/350 |
| 2005/0226231 A1* | 10/2005 | Skerlj et al. | 370/354 |
| 2008/0151941 A1* | 6/2008 | Ghodrat et al. | 370/503 |
| 2010/0074278 A1 | 3/2010 | Dobjelevski et al. | |

FOREIGN PATENT DOCUMENTS

EP 1860809 11/2007

OTHER PUBLICATIONS

"G.781: Synchronization layer functions", ITU-T, Sep. 2008.*
"G.8261: Timing and synchronization aspects in packet networks", ITU-T, Apr. 2008.*
"G.8262: Timing characteristics of a synchronous Ethernet equipment slave clock", ITU-T, Jul. 2010.*
"G.8264: Distribution of timing information through packet networks", ITU-T, Oct. 2008.*
Vitesse, "Clock Distribution and Synchronization over Ethernet: IEEE1588v2 and SyncE", Sep. 2009 (9 pages).
Calderon, J-C et al., Cortina Systems, "Packet format for the OTN over Packet Fabric IA", oif2010.380.00, Optical Internetworking Forum, Oct. 20, 2010, (7 pages).

(Continued)

*Primary Examiner* — Brian O'Connor
(74) *Attorney, Agent, or Firm* — Edell, Shapiro & Finnan, LLC

(57) ABSTRACT

Synchronization techniques for multiple clock domains from two or more clients or common pluggable interfaces connected to multiple interfaces on one or more ingress line cards to multiple interfaces on one or more egress line cards are provided. The plurality of clock domain information from the clients that are connected on the ingress side is transmitted to the egress line cards. Two or more egress interfaces generate different clocks that are synchronized to the multiple clock domains.

20 Claims, 9 Drawing Sheets

(56) References Cited

OTHER PUBLICATIONS

Roch, E. et al., Ciena, "Alternative View on Multilayer Mapping between Client and Server Layers", oif2011.217.00, Optical Internetworking Forum, May 31, 2011 (11 Pages).

Stuart, D. et al., Ciena, "OTN over Packet Fabric Protocol SAR Header Proposal", oif2010.213.00, Optical Internetworking Forum, Jun. 22, 2010 (12 pages).

Cisco Systems, Inc., "Synchronous Ethernet: Achieving High-Quality Frequency Distribution in Ethernet NGNs", 2008 Cisco Systems, Inc. (11 pages).

International Search Report and Written Opinion in counterpart International Application No. PCT/US2012/053721, mailed Jan. 2, 2013.

Ferrant, et al., "Synchronous Ethernet: A Method to Transport Synchronization," IEEE Communications Magazine, Sep. 2008, pp. 126-134.

OIF, "OTN over Packet Fabric Protocol Project Start Proposal," oif2010.151.04, May 25, 2010, pp. 1-15.

* cited by examiner ized clock that is based on one of the clock domains. Since there are multiple clocks available to choose from, the system is more resilient to one of the clocks being lost because the system has other clock sources to select from.

EGRESS CLOCK DOMAIN SYNCHRONIZATION TO MULTIPLE INGRESS CLOCKS

TECHNICAL FIELD

The present disclosure relates to synchronizing clocks on pluggable interfaces.

BACKGROUND

In current optical network transport equipment, each line card has multiple interfaces. Each interface can be connected to different clients on the ingress side. The transport equipment has the capability of transporting client traffic streams that have been generated using different clock domains. The transport equipment supports a single system reference clock and the egress clients are re-synchronized by a single clock.

Since the transport equipment has a single system reference clock, whenever the transport equipment receives two or more traffic streams, the transport equipment makes a selection of one of the traffic streams as a reference clock and all the egress traffic streams are then synchronous with the one selected. The clocks from the other traffic streams that are not selected are lost for the system because the system does not use them.

Transport network elements typically receive and aggregate traffic from a plurality of different clients into a single pipe. In this aggregation, the timing transparency is lost. At the time of segregation, the information is not accurately decoded because of the loss of the timing information.

Loss of the timing information has other side effects such as adding latency to the overall system efficiency. Current systems have to incorporate buffering mechanisms to support different clock domains and send signals to the clients when the buffers are full. The clients cannot transmit at their full capacity and therefore have to wait for the transport equipment to be ready before transmitting data.

DESCRIPTION OF EXAMPLE EMBODIMENTS

Overview

Synchronization techniques for multiple clock domains from two or more clients or common pluggable interfaces connected to multiple interfaces on one or more ingress line cards to multiple interfaces on one or more egress line cards are provided. The plurality of clock domain information from the clients that are connected on the ingress side is transmitted to the egress line cards. Two or more egress interfaces generate different clocks that are synchronized to the multiple clock domains.

Example Embodiments

Figure 1:
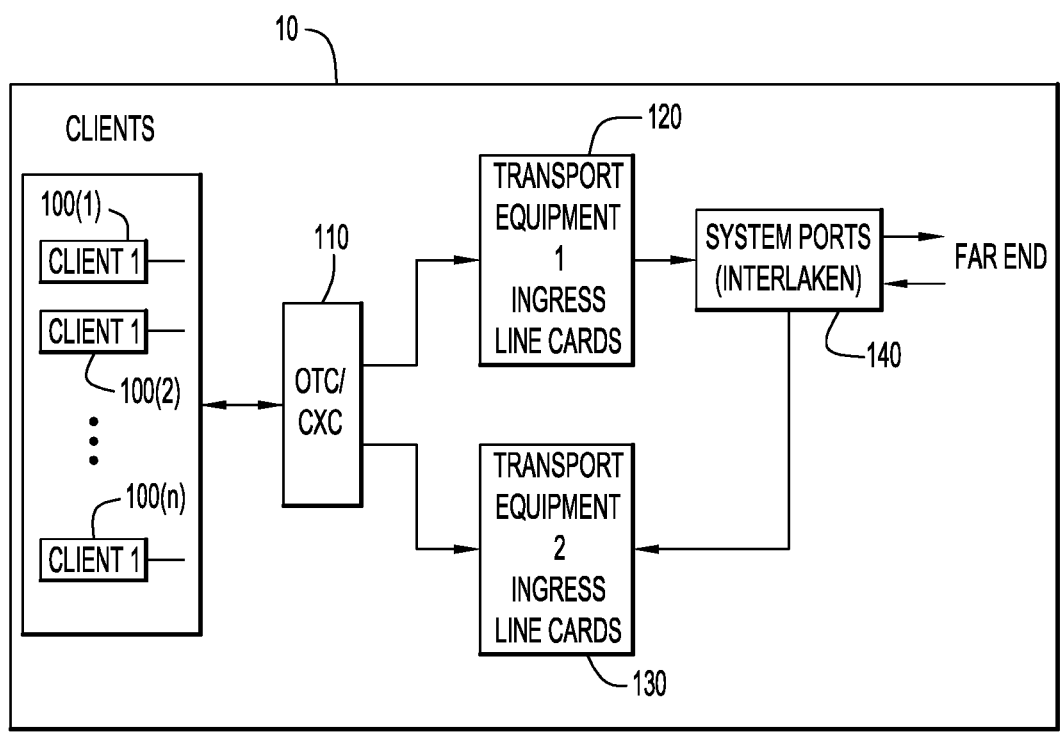
FIG. 1 is a block diagram showing an example of a system comprising first and second transport equipment configured to communicate multiple client traffic streams in accordance with the techniques described herein.

Referring first to FIG. 1, a system 10 is shown comprising client connections through pluggable interfaces. Reference numerals 100(1), 100(2), ... 100(n) are the different client connections connected to an Optical Transport Network (OTN) or a cross connect card (CXC) 110, which is in turn connected to first transport equipment 120 and second transport equipment 130. Transport equipment 120 and 130 communicate with each other through system ports (Interlaken) 140. For simplicity, the ingress line cards are shown in a separate transport equipment than an egress line cards. However, a single transport equipment may have both the ingress and egress line cards. Similarly the system ports 140 for Interlaken are shown in a separate block but they may be combined with one or more of the transport equipment functionality. Additionally, all the equipment shown in FIG. 1 can function in a full duplex mode. Furthermore, for simplicity and a simple use case, transport equipment 1 and transport equipment 2 are shown to be part of the same system 10. Note that transport equipment 1 and transport equipment 2 could be part of two different systems and two different parts of the network, i.e. one at the client end and one at the far end.

Figure 2:
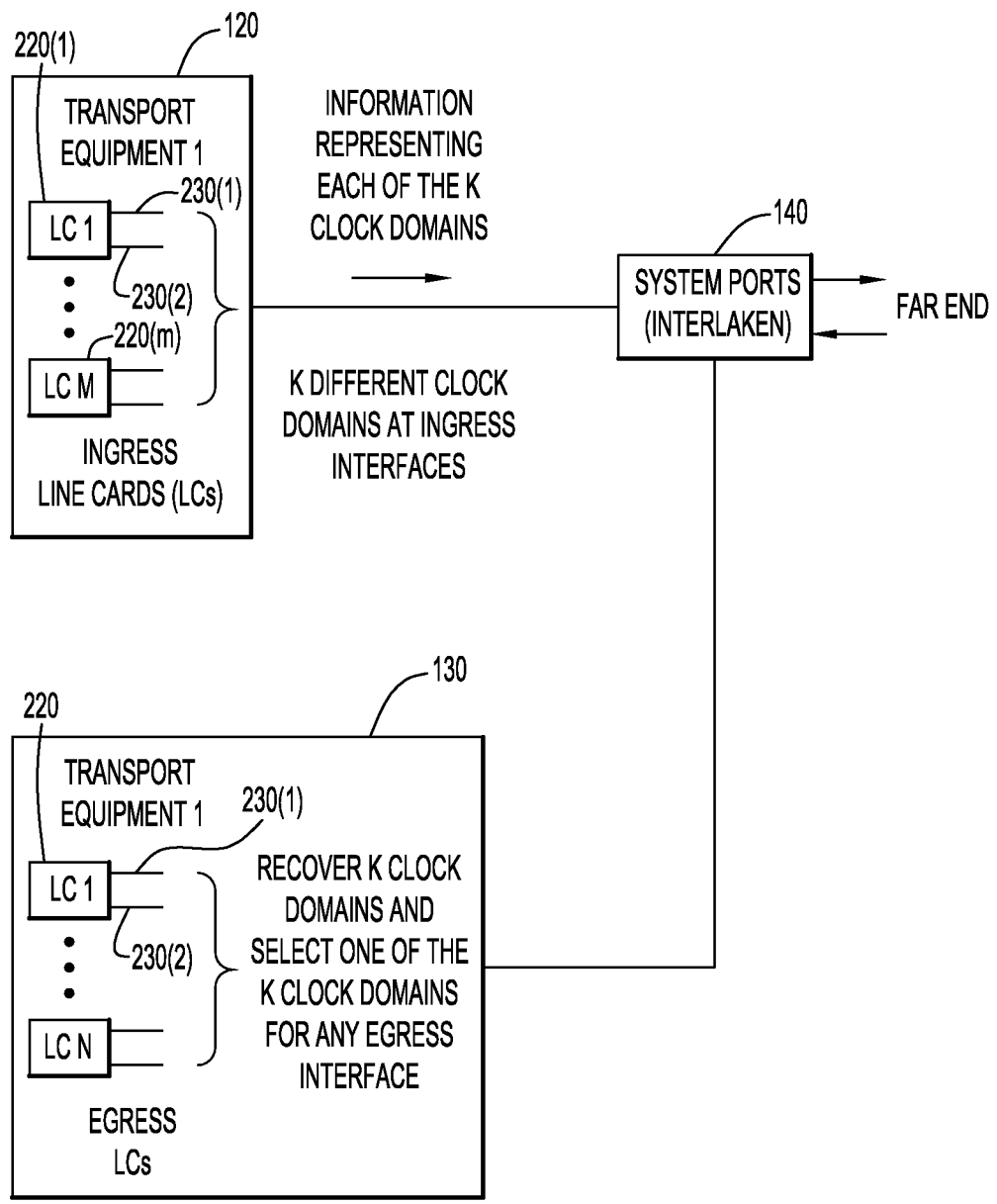
FIG. 2 is a block diagram showing an example of the components of the first and second transport equipment.

Turning now to FIG. 2, the first and second transport equipment 120 and 130 are shown in more detail. Each transport equipment 120 and 130 comprises at least one line card 220. Each line card 220 has two or more interfaces 230(1), 230(2)... 230(n). Thus, there are line cards 220 at the ingress side and line cards 220 at the egress side.

Some line cards are connected to the clients or common pluggable interfaces on the ingress side. Some line cards are connected to the egress side. Each transport equipment is fully duplex to handle traffic in both directions. A single line card may function as both an ingress and an egress line card.

According to the techniques described herein, the ingress line cards have interfaces that are connected directly to clients or common pluggable interfaces that are synchronized with K different clock domains. The interfaces on the ingress line cards transmit information representing each of the K clock domains. The egress line cards receive information of the K clock domains. The egress line cards generate a synchronized clock based on the received information such that the synchronized clock on at least one interface of the egress line card is different from the synchronized clock on another interface of the same or a different egress line card. The egress line cards can generate synchronized clocks based on each of the K clock domains.

When there are simultaneous traffic streams with a plurality of clock domains, the egress line cards can synchronize simultaneously to more than one clock domains. As a result, the egress line cards no longer have to make a selection as to the best clock and discard the timing information contained in the other traffic streams. The egress side can generate a synchronized clock for each of the multiple interfaces on an egress line card from the information for one or more interfaces on two different ingress line cards. Moreover, the egress side can generate a synchronized clock for each of multiple interfaces on two or more egress line cards from the information for multiple interfaces on an ingress line card.

The first transport equipment and the second transport equipment can be configured to transmit information to each other using any of a variety of protocols including, without limitation: ODUk protocol, non-ODUk protocol, optical transport network, Ethernet or Fibre-Channel. Again, the techniques described herein are not dependent on any particular protocol or packet format used to transmit the information.

Figure 3:
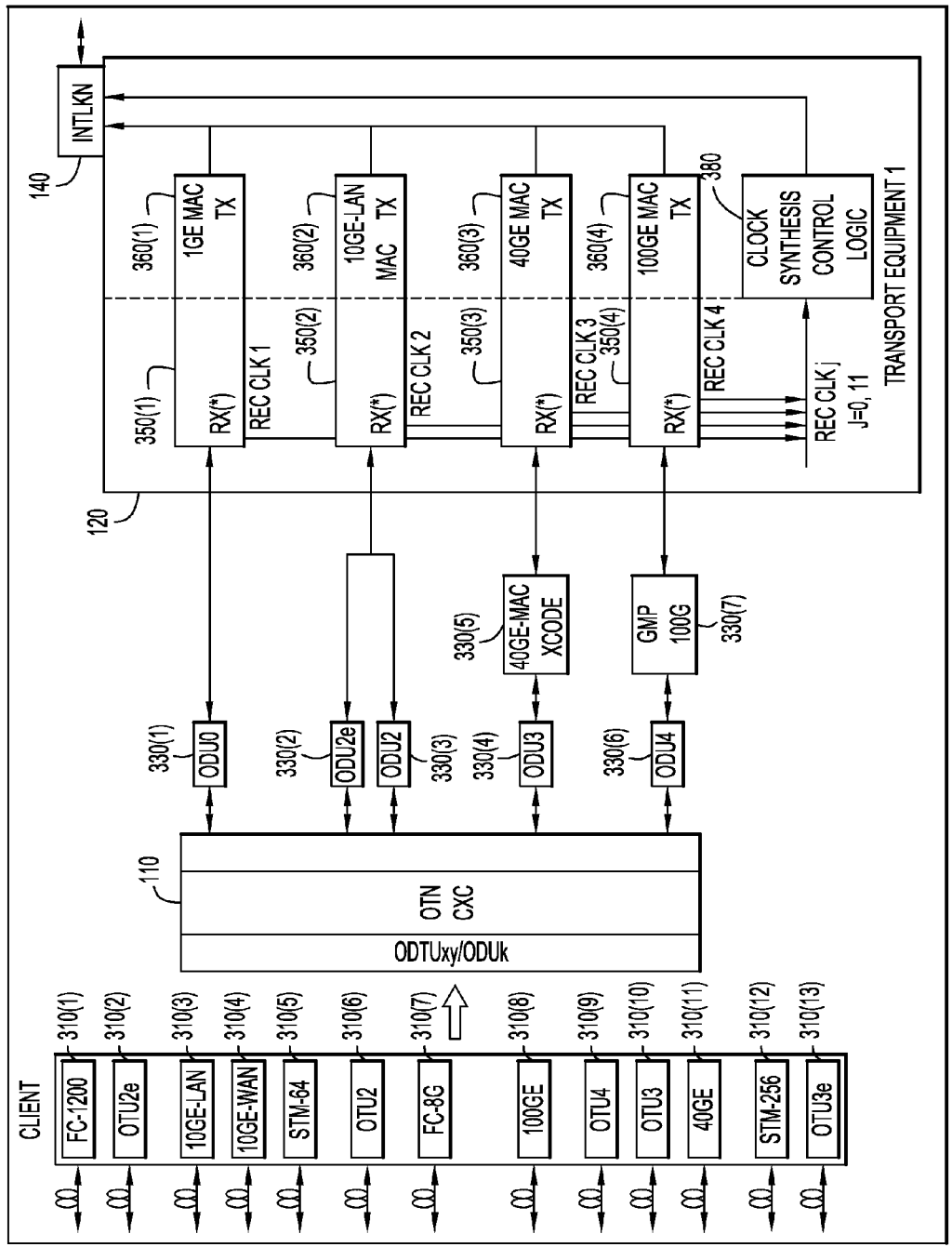
FIG. 3 is a block diagram showing an example of the flow of packets through transport equipment at the ingress side.

Reference is now made to the block diagram of FIG. 3 that shows an example of flow of packets through transport equipment at the ingress side, that is, through transport equipment 120. The ingress side is shown at reference 300 and having a plurality of different client connections such as Fiber Chanel (FC)-1200 310(1), OTU2e 310(2), 10GE-LAN 310(3), 10GE-WAN 310(4), STM-64 310(5), OTU2 310(6), FC-8G 310(7), 100GE 310(8), OTU4 310(9), OTU3 310(1)0, 40GE 310(11), STM-256 310(12) and OTU3e 310(13). The incoming client packets are data packets from different channels in the optical transport network. Optical Channel Data Units (ODU)s are shown at reference numerals 330(1), 330(2), ... 330($n$). For example, ODUs 330(5) and 330(7) show the mapping of Ethernet packets over ODUx. The optical networking standards allow for different ways of mapping Ethernet packets over ODUx.

The Transport Equipment 1 120 includes receive ports 350(1), 350(2) ... 350($n$) and a corresponding plurality of Media Access Control (MAC) ports 360(1)-360($n$). Each of the receive ports may receive a receive clock. The received clocks are multiplexed by clock synthesis control logic 380 that generates and transmits synthesized recovered clocks. The received channel from the receive ports 350(1) is coupled to the corresponding Media Access Control (MAC) port 360(1). Similarly, received channel 350(2) channel is coupled to MAC port 360(2) and receive channel 350($n$) is coupled to MAC port 360($n$). The channel data is then aggregated with the synthesized recovered clocks for each channel and sent to the system ports 140.

The client connections each transmit clock domain information. The frequency of this clock domain is extracted after the OTN/CXC 110 and forwarded by the Fabric to the appropriate line cards on the Transport Equipment 1. Each client data stream includes timestamp in the packets. On a periodic basis, the clock synthesis control logic 380 in the Transport Equipment 1 sends a client specific packet indicating the number of received client bits in this time interval from all the clients connected to all the line cards.

Figure 4:
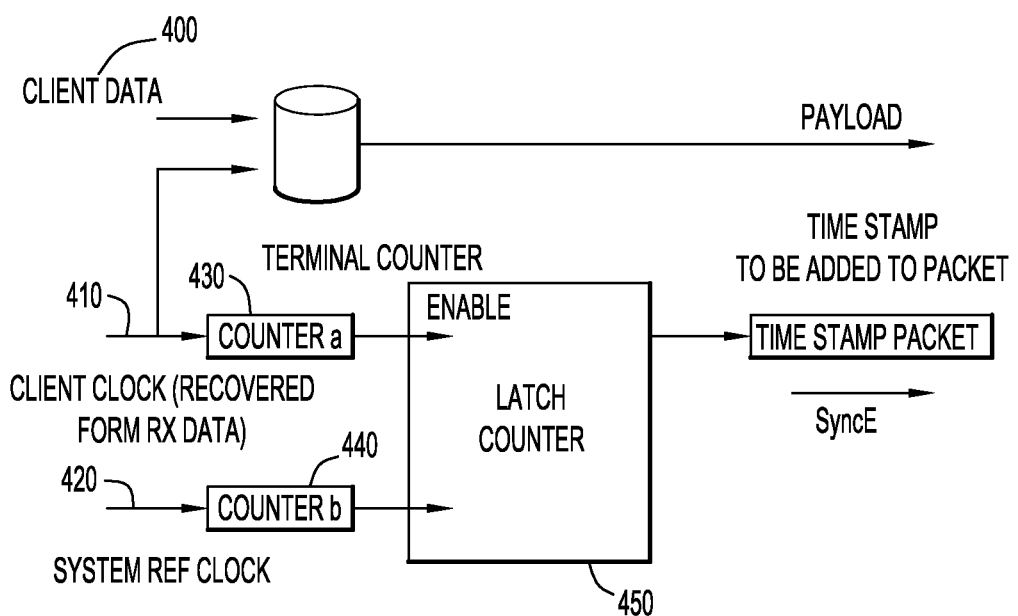
FIG. 4 is a block diagram of components at the ingress side transport equipment that generates timestamp information for each clock domain at the ingress side.

Reference is now made to FIG. 4, a block diagram of components at the ingress side transport equipment that generates timestamp information for each clock domain at the ingress side. The Transport Equipment 1 incorporates the functionality described in connection with FIG. 4. The client data 400 is received client data from different interfaces on different ingress line cards. The clock synthesis control logic 380 in the transport equipment recovers the client clock 410 from the received client data 400. The Transport Equipment 1 has a single system reference clock 420. A first counter (Counter A) 430 is a counter that can be set to reset when it counts up to a fixed value. For example, counter 430 can be reset at value 256. Counter A defines the periodic time interval when the transport equipment sends a client specific packet indicating the number of client bits received from the clients. A second counter (Counter B) 440 counts to a value that is stored in a latch counter 450 every time the counter 430 reaches a value multiplied by the client clock. The client clock is monitored with the differential timing information from the system reference clock. The count values of counter 440 values are sent in the client specific packet indicating the number of received client bits.

Additionally based on the clock domain, the transport equipment on both the near end and the far end may exchange synchronization signals and support synchronization commands. SyncE is a standard for distribution of frequency over Ethernet links. SyncE specifications and requirements are bounded by four primary standards: (1) ITU-T G.8261: Timing and synchronization aspects in packet network (2) ITU-T G.8262: Timing characteristics of Synchronous Ethernet equipment slave clock (3) ITU-T G.8264: Distribution of timing through packet networks (4) ITU-T G.781: Synchronization layer functions. For example, if the transport equipment at both ends supports the SyncE standard, then the ingress line cards may transmit the SyncE signal when it exchanges the SSM_QL bits.

Other standards (such as the IEEE 1588 Precision Time Protocol (PTP), IETF Network Time Protocol (NTP), etc.) have been and are being developed or enhanced for high-quality time distribution and Adaptive Clock Recovery (ACR) requirements. The techniques disclosed herein are compatible with the standards in the industry and not limited to any particular standards implementation.

Figure 5:
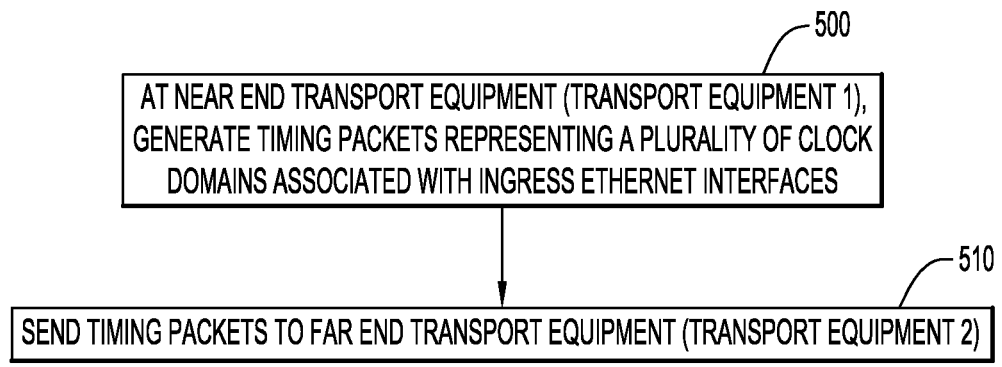
FIG. 5 is a flow chart that generally depicts operations of generating and sending clock domain information at the ingress side.

Reference is now made to FIG. 5 showing a flow chart that generally depicts operations of generating and sending clock domain information at the ingress side. At 500, the control logic in the transport equipment on the ingress side generates timing packets representing a plurality of clock domains associated with ingress client interfaces. For example, the ingress client interface is an Ethernet interface. At 510, the timing packets are sent to the far end transport equipment.

Figure 6:
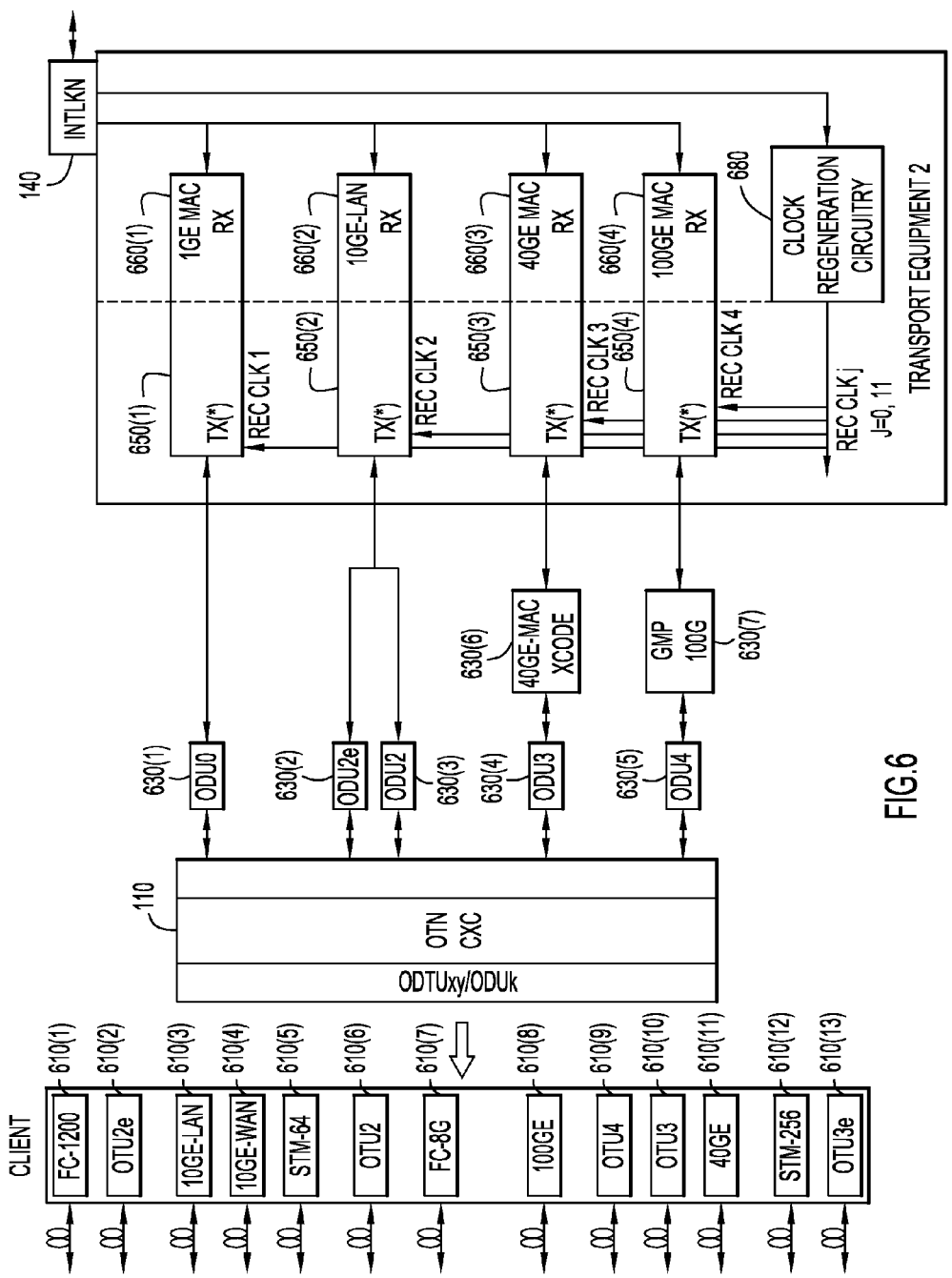
FIG. 6 is a block diagram showing an example of the flow of packets through transport equipment at the egress side.

Reference is now made to FIG. 6 showing a block diagram of an example flow of packets through transport equipment at the egress side. The egress side is shown comprising a plurality of different client connections such as FC-1200 610(1), OTU2e 610(2), 10GE-LAN 610(3)), 10GE-WAN 610(4), STM-64 610(5), OTU2 610(6), FC-8G 610(7), 100GE 610(8), OTU4 610(9), OTU3 610(1)0, 40GE 610(11), STM-256 610(12) and OTU3e 610(13). The outgoing client packets 630(1), 630(2), ... 630($n$) are data packets from different channels in the optical transport network. For example, OTUs 630(6) and 630(7) show the mapping of Ethernet packets over ODUx.

The optical channels 640 are transmitted by the Transport Equipment 2 130 via transmit ports 650(1), 650(2) ... 650($n$) and a corresponding plurality of MAC ports 660(1)-660($n$). Each of the transmit ports may receive a transmit clock. The transmit clocks are de-multiplexed by clock regeneration circuitry 680 that generate the recovered clocks. The transmit channel is coupled from the MAC port 660(1) to the corresponding transmit ports 650(1). Similarly, transmit channel 650(2) channel is coupled from the MAC port 660(2) and transmit channel 650($n$) is coupled from MAC port 660($n$). The channel data received from the systems ports 140 is then segregated with the recovered clocks for each channel.

Figure 7:
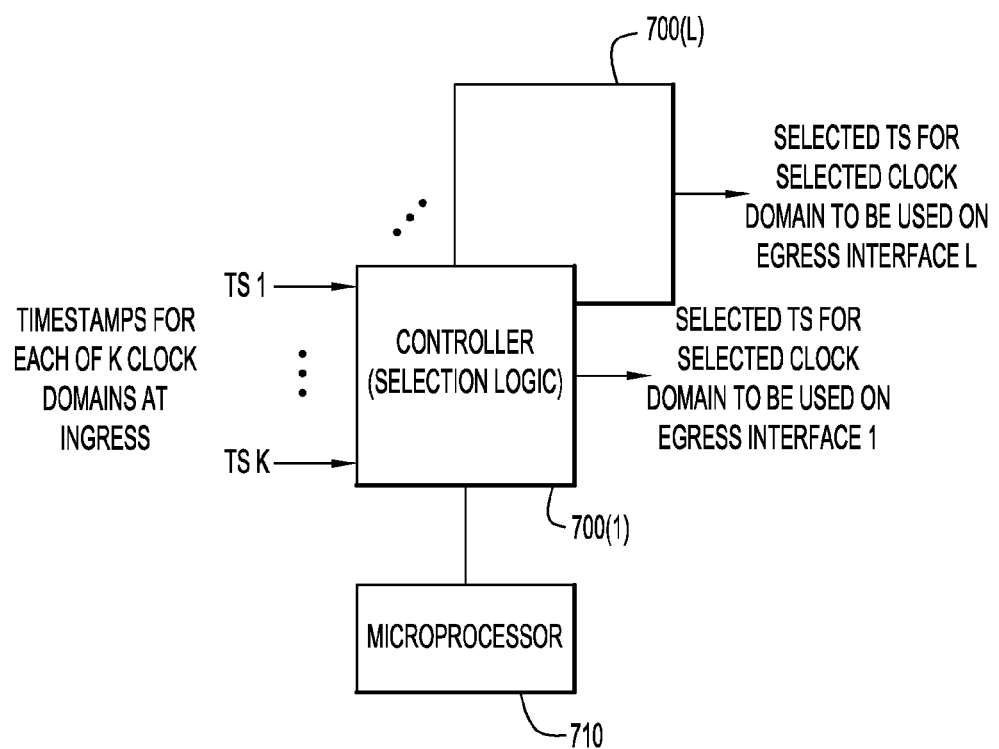
FIG. 7 is a block diagram of circuitry at the egress side that is configured to select a clock domain for each egress interface.

Turning now to FIG. 7, a block diagram is shown of circuitry at the egress side that is configured to select a clock domain for each egress interface. There is a control logic block 700(1)-700(1) provided for each egress interface to segregate each recovered clock based on the received timestamp information for each of the K clock domains originating from the ingress side. The transport equipment tracks and maps each selected clock domain to be used on each egress interface. The control logic 700(i) may be implemented as digital logic gates in an application specific integrated circuit (ASIC). A microprocessor 710 is provided that is coupled to each instance of the control logic 700(1)-700(1) to gate the outputs therefrom.

Figure 8:
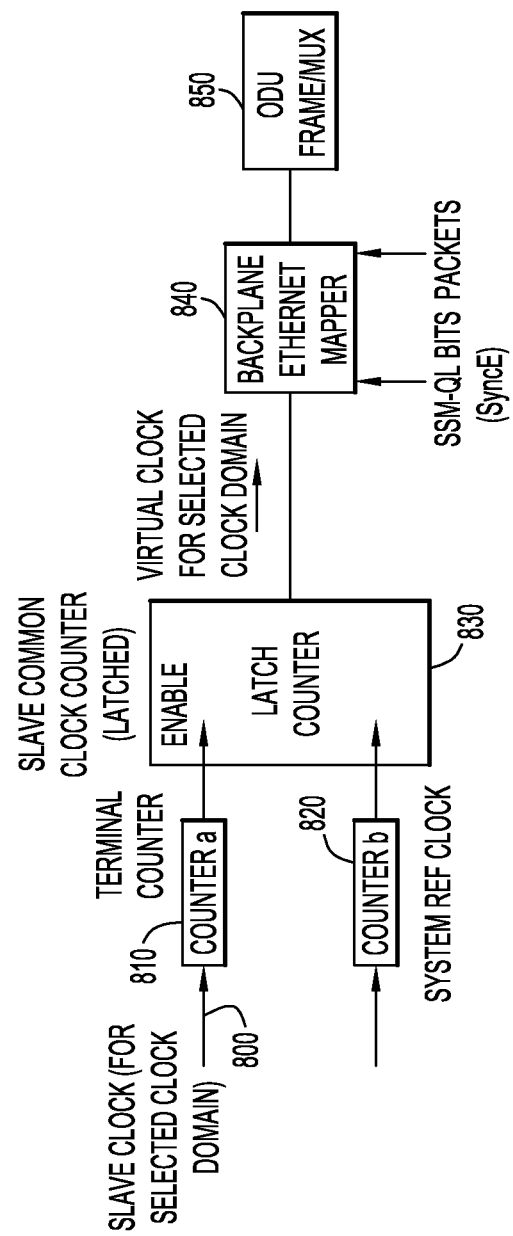
FIG. 8 is a block diagram of components at the egress side transport equipment that recovers a selected clock domain for an egress interface.

Reference is now made to FIG. 8, a block diagram of components at the egress side transport equipment that recover a selected clock domain for an egress interface. The logic described in connection with FIG. 8 is implemented in the clock regeneration circuitry 480 (FIG. 6) on the transport equipment with the egress line cards. The recovered client clock on the egress side is called a slave clock 800(n). A first counter (Counter A) 810 is set to count to a fixed value, for example 256. A second counter (Counter B) 820 is the system reference clock for the transport equipment. A latch counter 830 is coupled to the outputs of the counters 810 and 820. Every time the counter 810 is reset, the latch counter 830 stores the value of the counter 820. The value in the latch counter 830 is then compared to the number received in the client specific packet transmitted from the ingress side. If the value from the second counter 830 is equal to the value that was transmitted from the ingress side, then the clock frequency is synthesized at the correct frequency, otherwise the slave clock should be increased or decreased. Once the correct slave clock frequency is achieved, the clock is transmitted to a backplane Ethernet mapper at 840 and the channel data is then transmitted through to the ODU Framer/Mux 850 back to the client. The Ethernet mapper 840 is used only for corresponding client Ethernet interfaces. Additionally, the egress line cards may synchronize the egress MAC clocks based on the recovered slave clock.

Additionally, the recovered egress slave clock can be reset by a synchronization signal received from the ingress side that contains clock having timing information only. The transport equipment can also support a synchronization command to reset the clock. For example, if the transport equipment at both ends supports the SyncE standard, the recovered slave clock is passed through a Digital Phase Lock Loop (DPLL) to remove high frequency jitter and generate a 125 MHz virtual clock. The virtual clock can then be used to time multiple packets to SyncE clients for mapping into multiple ODUj flows. The transport equipment can support more than one timing segment and more than one timing reassembly for SyncE.

Figure 9:
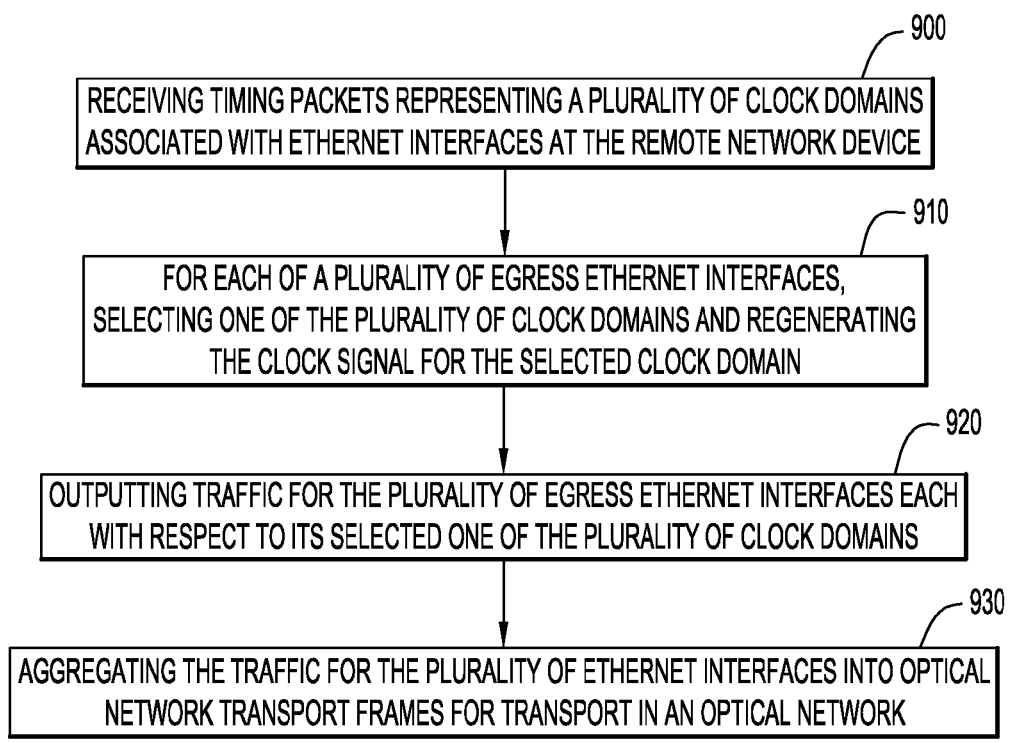
FIG. 9 is a flow chart illustrating operational flow at the egress side.

Reference is now made to FIG. 9, which shows a flow chart depicting operational flow at the egress side for an Ethernet interface. At 900, timing packets representing a plurality of clock domains associated with Ethernet interfaces are received at the remote network device. At 910, for each of the plurality of egress Ethernet interfaces, one of the plurality of clock domains is selected and the clock signal for the selected clock domain is regenerated. At 920, traffic is output for the plurality of egress Ethernet interfaces, each with respect to its selected one of the plurality of clock domains. At 930, the traffic for the plurality of Ethernet interfaces is aggregated into optical network transport frames for transport in an optical network.

The multiple clock synchronization techniques described herein may be in the form of methods as described herein. In addition, these techniques may be in the form of an apparatus and one or more computer readable storage media. In apparatus form, the apparatus comprises transport equipment with line cards configured to transmit and receive data from the client and far end. The transport equipment implements control logic to determine how to aggregate and de-segregate different client clock domains for different channels connected to the different interfaces.

In computer readable storage media form, one or more computer readable storage media are encoded with software comprising computer executable instructions and when the software is executed operable to: generating information representing each of the clock domains received from the ingress line cards; transmitting the information to the egress line cards; generating a synchronized clock on each interface of the one or more egress line card using the information such that the synchronized clock on at least one interface of the egress line card is different from the synchronized clock on another interface of the same or a different egress line card.

In method form, a method is provided for synchronizing multiple clock domains from two or more clients or common pluggable interfaces connected to multiple interfaces on one or more ingress line cards to multiple interfaces on one or more egress line cards, the method comprising: generating information representing each of the clock domains received from the ingress line cards; transmitting the information to the egress line cards; generating a synchronized clock on each interface of the one or more egress line card using the information such that the synchronized clock on at least one interface of the egress line card is different from the synchronized clock on another interface of the same or a different egress line card.

A method is also provided for synchronizing multiple clock domains on multiple interfaces on one or more egress line cards, the method comprising: receiving timing packets representing a plurality of clock domains associated with interfaces at a remote network device; for each of a plurality of egress interfaces, selecting one of the plurality of clock domains and regenerating the clock signal for the selected clock domain; and outputting traffic for the plurality of egress interfaces each with respect to its selected one of the plurality of clock domains.

Still further, a method is provided for synchronizing multiple clocks on multiple interfaces on one or more ingress line cards, the method comprising: monitoring timing information of each client traffic stream connected to an ingress line card; generating timing packets representing a plurality of clock domains associated with ingress interfaces on the ingress line card, wherein the timing packets comprise timestamps and information indicting number of client bits within a period of time for a corresponding client traffic stream; and transmitting the timing packets to an egress line card.

In addition, a system is provided comprising: first transport equipment configured to receive data from two or more clients or common pluggable interfaces connected to multiple interfaces on one or more ingress line cards and second transport equipment comprising multiple interfaces on one or more egress line cards; wherein the first transport equipment is configured to generate information representing each of a plurality of clock domains associated with client traffic on the ingress line cards; and to transmit the information to the second transport equipment; wherein the second transport equipment is configured to generate a synchronized clock on each interface of the one or more egress line card using the information such that the synchronized clock on at least one interface of the egress line card is different from the synchronized clock on another interface of the same or a different egress line card.

The above description is intended by way of example only.

What is claimed is:

1. A method for synchronizing multiple clock domains from two or more clients or common pluggable interfaces connected to multiple interfaces on one or more ingress line cards on a first transport network element to multiple interfaces on one or more egress line cards on a second transport network element, the method comprising:

generating clock information representing each of the clock domains received from the ingress line cards, the clock information comprising a count of a system reference clock when a client clock for each of the clock domains reaches a fixed value;

transmitting the clock information to the egress line cards on the second transport network element; and generating a synchronized clock on each interface of the one or more egress line cards using the clock information such that the synchronized clock on at least one interface of the egress line card is different from the synchronized clock on another interface of the same or a different egress line card.

2. The method of claim 1, wherein generating a synchronized clock comprises generating a synchronized clock for each of the multiple interfaces on an egress line card from the clock information for one or more interfaces on two different ingress line cards.

3. The method of claim 1, wherein generating a synchronized clock comprises generating a synchronized clock for each of multiple interfaces on two or more egress line cards from the clock information for multiple interfaces on an ingress line card.

4. The method of claim 1, wherein generating a synchronized clock comprises comparing a count of an egress system reference clock to the count of the system reference clock when the synchronized clock reaches the fixed value, and adjusting a frequency of the synchronized clock until the count of the egress system reference clock and count of the system reference clock are substantially equal.

5. The method of claim 1, further comprising:
resetting a synchronized clock at an egress line card by sending a timing only clock from an ingress line card to an egress line card.

6. The method of claim 5, further comprising:
triggering reset of a synchronized clock in response to receiving a synchronization command.

7. A method for synchronizing multiple clock domains on multiple interfaces on one or more egress line cards, the method comprising:

receiving timing packets representing a plurality of clock domains associated with interfaces at a remote network element, wherein each timing packet comprises a count of a system reference clock of the remote network element when a client clock for each of the clock domains reaches a fixed value;

for each of a plurality of egress interfaces, selecting one of the plurality of clock domains and regenerating the clock signal for the selected clock domain using the timing packets; and outputting traffic for the plurality of egress interfaces each with respect to its selected one of the plurality of clock domains.

8. The method of claim 7, and further comprising aggregating the traffic for the plurality of interfaces into optical network transport frames for transport in an optical network.

9. The method of claim 7, wherein the egress interface is an Ethernet interface.

10. The method of claim 7, further comprising regenerating the clock signal for the selected clock domain comprises comparing a count of an egress system reference clock to the count of the system reference clock of the remote network element when the clock signal reaches the fixed value, and adjusting a frequency of the clock signal until the count of the egress system reference clock and count of the system reference clock are substantially equal.

11. A method for synchronizing multiple clocks on multiple interfaces on one or more ingress line cards, the method comprising:

monitoring timing information of each client traffic stream connected to an ingress line card;

generating timing packets representing a plurality of clock domains associated with ingress interfaces on the ingress line card, wherein the timing packets comprises a count of a system reference clock when a client clock for each of the clock domains reaches a fixed value; and transmitting the timing packets to an egress line card.

12. A system comprising:

first transport equipment configured to receive data from two or more clients or common pluggable interfaces connected to multiple interfaces on one or more ingress line cards and second transport equipment comprising multiple interfaces on one or more egress line cards;

wherein the first transport equipment is configured to generate clock information representing each of a plurality of clock domains associated with client traffic on the ingress line cards, the clock information comprising a count of a system reference clock when a client clock for each of the clock domains reaches a fixed value, and to transmit the clock information to the second transport equipment;

wherein the second transport equipment is configured to generate a synchronized clock on each interface of the one or more egress line card using the clock information such that the synchronized clock on at least one interface of the egress line card is different from the synchronized clock on another interface of the same or a different egress line card.

13. The system of claim 12, wherein the first transport equipment and the second transport equipment are configured to transmit information to each another using one or more of the following: ODUk protocol, non-ODUk protocol, optical transport network, Ethernet, Fibre-Channel.

14. The system of claim 12, wherein the first transport equipment is configured to generate a synchronized clock for each of the multiple interfaces on an egress line card from the clock information for one or more interfaces on two different ingress line cards.

15. The system of claim 12, wherein the first transport equipment is configured to generate a synchronized clock for each of multiple interfaces on two or more egress line cards from the clock information for multiple interfaces on an ingress line card.

16. The system of claim 12, wherein the second transport equipment is configured to generate a synchronized clock by comparing a count of an egress system reference clock to the count of the system reference clock when the synchronized clock reaches the fixed value, and adjusting a frequency of the synchronized clock until the count of the egress system reference clock and count of the system reference clock are substantially equal.

17. The system of claim 12, wherein the second transport equipment comprises a controller configured to select one of the plurality of clock domains for a particular interface on one of the egress line cards.

18. An apparatus comprising:
one or more egress line cards each comprising multiple interfaces;
a controller configured to select, from a plurality of timing packets, one of a plurality of clock domains associated with interfaces at a remote network element for respective interfaces on the one or more egress line cards, wherein each timing packet comprises a count of a system reference clock of the remote network element when a client clock for each of the clock domains reaches a fixed value;

clock regeneration circuitry configured to synchronize corresponding selected ones of the plurality of clock domains with respective interfaces on the one or more egress line cards; and wherein each egress interface is configured to output traffic with respect to its selected clock domain.

19. The apparatus of claim 18, wherein the interfaces on the ingress line cards connect via a single communications pipe to the interfaces on the egress line cards, and wherein the ingress line cards and egress line cards operate in full duplex mode such that the ingress line cards may simultaneously function as egress line cards, and the egress line cards may simultaneously function as ingress line cards.

20. The apparatus of claim 18, wherein the clock regeneration circuitry is configured to receive the timing packets that include timestamps for packets indicating the number of client bits in a period of time for a client traffic stream at the remote network device element, and to recover a clock signal for the selected clock domain by comparing the number of client bits received within a period of time with respect to the timestamps.

* * * * *

UNITED STATES PATENT AND TRADEMARK OFFICE
CERTIFICATE OF CORRECTION

PATENT NO. : 8,737,389 B2  
APPLICATION NO. : 13/267088  
DATED : May 27, 2014  
INVENTOR(S) : Luca Della Chiesa et al.

Page 1 of 1

It is certified that error appears in the above-identified patent and that said Letters Patent is hereby corrected as shown below:

In the claims,

Column 9, Line 23, remove the word "device" after the word "network"

Signed and Sealed this  
Eighth Day of March, 2016

Michelle K. Lee  
*Director of the United States Patent and Trademark Office*